US008654348B2

(12) United States Patent
Primot et al.

(10) Patent No.: US 8,654,348 B2
(45) Date of Patent: Feb. 18, 2014

(54) METHOD, PHASE GRATING AND DEVICE FOR ANALYZING A WAVE SURFACE OF A LIGHT BEAM

(75) Inventors: Jérôme Primot, Chatillon (FR); Bruno Toulon, Saligny (FR); Nicolas Guérineau, Antony (FR); Sabrina Velghe, Villebon-sur-Yvette (FR); Riad Haidar, Paris (FR)

(73) Assignee: Office National d'Etudes et de Recherches Aerospatiales (Onera), Chatillon (FR)

( * ) Notice: Subject to any disclaimer, the term of this patent is extended or adjusted under 35 U.S.C. 154(b) by 612 days.

(21) Appl. No.: 12/426,994

(22) Filed: Apr. 21, 2009

(65) Prior Publication Data
US 2009/0262364 A1 Oct. 22, 2009

(30) Foreign Application Priority Data

Apr. 22, 2008 (FR) ...................................... 08 52688

(51) Int. Cl.
*G01B 9/02* (2006.01)
(52) U.S. Cl.
USPC .......................................... 356/521; 359/566
(58) Field of Classification Search
USPC .................. 356/521, 520, 512; 359/558, 566
See application file for complete search history.

(56) References Cited

U.S. PATENT DOCUMENTS

| | | | | |
|---|---|---|---|---|
| 3,829,219 A * | 8/1974 | Wyant | ............................. | 356/489 |
| 5,606,417 A * | 2/1997 | Primot et al. | .................. | 356/515 |
| 6,577,403 B1 * | 6/2003 | Primot et al. | .................. | 356/521 |
| 6,765,681 B1 * | 7/2004 | Sweetser et al. | .............. | 356/515 |
| 6,819,435 B2 * | 11/2004 | Arieli et al. | .................... | 356/512 |

(Continued)

FOREIGN PATENT DOCUMENTS

| | | |
|---|---|---|
| EP | 1 061 349 | 6/2000 |
| FR | 2 682 761 | 10/1991 |
| FR | 2 712 978 | 11/1993 |
| FR | 2 795 175 | 6/1999 |
| FR | 2 896 583 | 1/2006 |
| FR | 2 897 426 | 2/2006 |

OTHER PUBLICATIONS

J. Primot et al., "Achromatic Three-Wave (or more) Lateral Shearing Interferometer," Journal of Optical of Society of America A, vol. 12, No. 12 (Dec. 1995), pp. 2679-2685.

*Primary Examiner* — Tarifur Chowdhury
*Assistant Examiner* — Jonathan Hansen
(74) *Attorney, Agent, or Firm* — Harness, Dickey & Pierce, P.L.C.

(57) ABSTRACT

The application relates to a method for analyzing the wave surface of a light beam from a source to the focus of a lens. The beam illuminates a sample on the analysis plane and having a defect. A diffraction grating of the plane is a conjugate of an analysis plane through a focal system. An image is formed in a plane at a distance from the grating plane and analyzed by processing means. The invention encodes this grating by a phase function resulting from the multiplication of two phase functions, a first exclusion function defining a meshing of useful zones transmitting the beam to be analyzed in the form of light pencil beams, and a second phase fundamental function which creates a phase opposition between two light pencil beams coming out of adjacent meshes of the exclusion grating.

14 Claims, 4 Drawing Sheets

(56) References Cited

U.S. PATENT DOCUMENTS

| | | | |
|---|---|---|---|
| 7,085,055 B2* | 8/2006 | Ito et al. | 359/565 |
| 7,417,745 B2* | 8/2008 | Haidner et al. | 356/515 |
| 7,495,200 B1* | 2/2009 | Andersen | 250/201.9 |
| 7,826,066 B2* | 11/2010 | Primot et al. | 356/521 |
| 7,864,340 B2* | 1/2011 | Primot et al. | 356/521 |
| 2006/0238854 A1 | 10/2006 | Haidar et al. | |

* cited by examiner

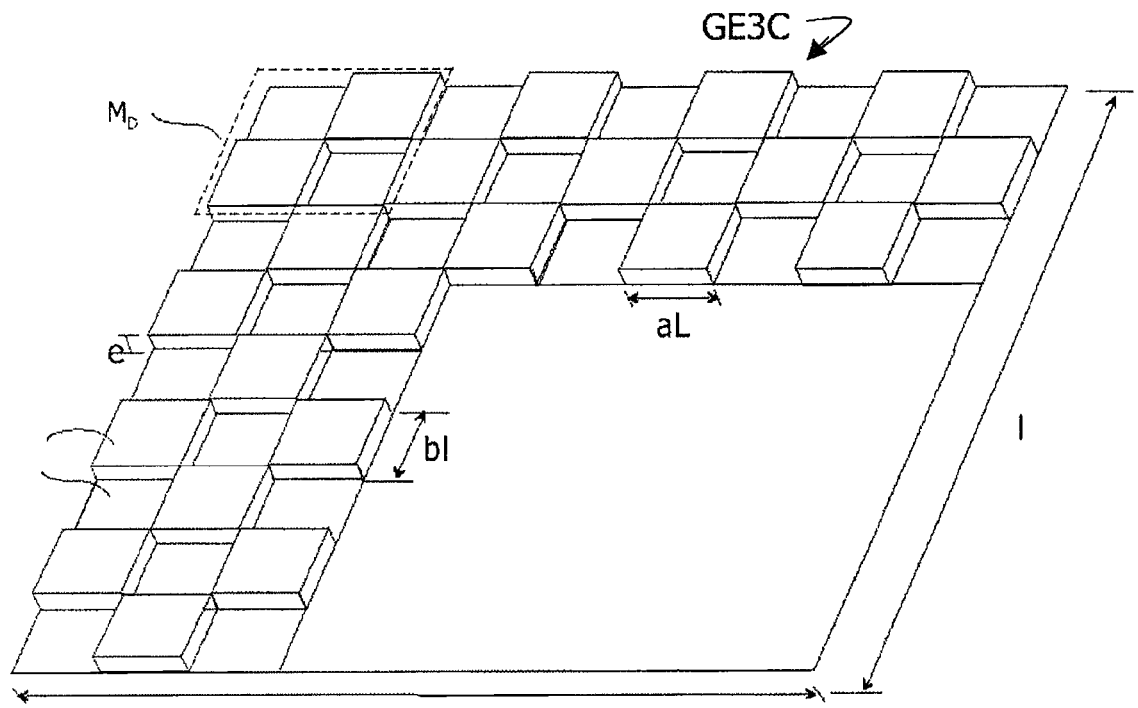
FIG.3C
FIG.4
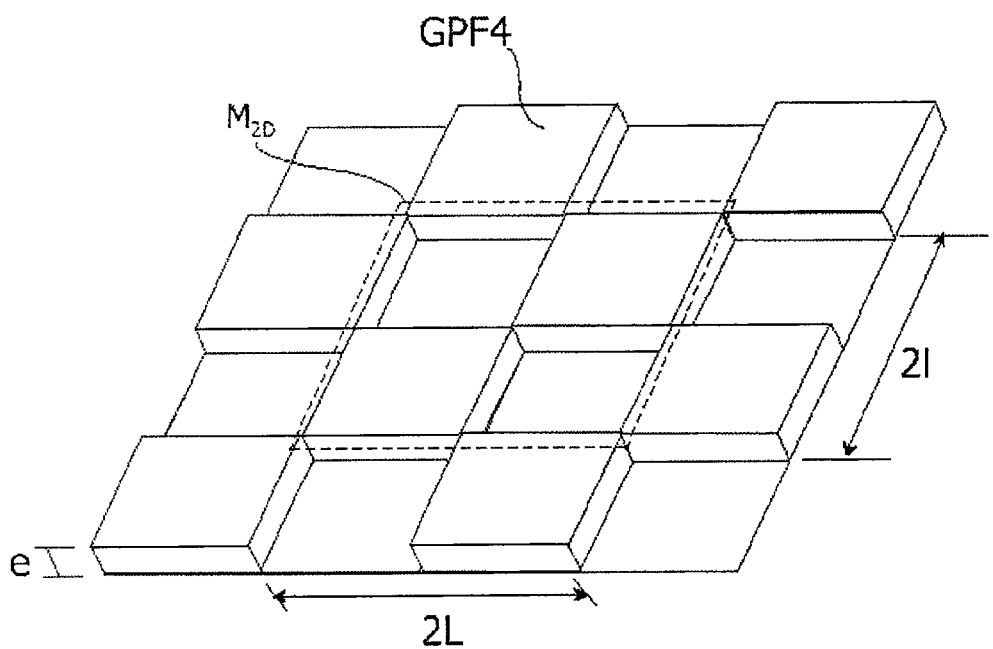

US 8,654,348 B2

METHOD, PHASE GRATING AND DEVICE FOR ANALYZING A WAVE SURFACE OF A LIGHT BEAM

CROSS REFERENCE TO RELATED APPLICATION

This application claims priority to French Application No. 0852688, filed Apr. 22, 2008, which is incorporated by reference herein.

BACKGROUND AND SUMMARY

The invention relates to a method, a phase grating and a device intended for analyzing the wave surface of a light beam for an optical control. This type of analysis is intended for controlling optical elements, for the qualification of optical devices as well as for the operation of deformable optical elements used in active or adaptative optics. It also makes it possible to study non directly measurable physical phenomena, such as the variations in the optical index inside turbulent media which can be met when going through the terrestrial atmosphere or in a wind tunnel pipe. It is also used for controlling the flatness of electronic components, for example matrix focal planes, as well as for shaping power laser beams.

State of the Art

The type of analysis according to the invention more particularly relies on multilateral shearing interferometry described for example in the patents FR 2 682 761 and FR 2 712 978 and implemented. This type of wave surface analysis is based on the utilization of a two-dimensional diffraction grating positioned on the path of the beam to be analyzed. Such a grating is defined in the following part of this description as being an optical device introducing periodical variations in the phase, the intensity or in the phase and in the intensity. Every grating is thus characterized by the multiplication of two functions: one function, also called a phase function, showing the periodical phase variations introduced by a phase grating and the other one, also called an intensity function, showing the periodical intensity variations introduced by an intensity grating.

According to the patent FR 2 712 978 in the name of the applicant, the composition mode and the definition of a two-dimensional grating is mentioned hereinunder. An assembly of spots regularly positioned along two directions provides a plane meshing. Such spots define an array element. The array element is the smallest surface making it possible to carry out a gapless tiling of the plane. The polygon of the array element is the minimum surface polygon the sides of which are supported by the right bisectors of the segments connecting any point of the assembly to the closest neighbors thereof. A two-dimensional grating is the repetition at will of an elementary pattern positioned according to a plane meshing. A plane meshing can define hexagonal or rectangular array elements, with the square meshes being only a particular case of the latter.

When a diffraction grating is lit with a light beam also called an incident beam, the light beams diffracted by the grating, also called emergent beams, can be described according to two equivalent approaches. The first approach consists in considering the emerging beams as replicas of the incident beam. They are called sub-beams, with each one corresponding to a grating diffraction order. The second approach consists in considering the emerging beams as beams transmitted by each mesh of the grating. They are also called secondary beams.

In the patents FR 2 712 978 and FR 2 795 175 in the name of the applicant, trilateral and quadrilateral shearing interferometers based on diffraction gratings are more particularly described. Using a diffraction grating based assembly, the beam to be analyzed is optically subdivided into three (trilateral) or four (quadrilateral) emerging beams. A particular optical treatment of the emerging beams thus obtained makes it possible to view an interferogram composed of a spot meshing which is sensitive to the gradient of the wave surface.

More particularly, in the patent FR 2 712 978 already mentioned above, the trilateral shearing interferometer described implements a phase and/or intensity two-dimensional grating and a spatial filtering system. In the approach of the partition into sub-beams, the grating optically subdivides in a conjugated plane of the defect, the incident beam to be analyzed into three sub-beams. A particular optical treatment of the three sub-beams thus obtained makes it possible to view an interferogram composed of a hexagonal meshing of light spots, the contrast of which is invariant, whatever the chosen viewing plane. This interferogram is sensitive to the gradients of the wave surface and this is true with a possible continuous adjustment of dynamics and sensitivity.

The viewing distance is defined as the distance separating the chosen viewing plane from the so-called null sensitivity plane, with the latter being a conjugated plane of the grating plane positioned downstream of the spatial filtering. In the article "Achromatic Three-Wave (or more) Lateral Shearing Interferometer", Journal of Optical Society of America A, volume 12, No 12, December 1995, the applicant describes the modification of such an interferometer towards a quadrilateral shearing interferometer, for which the two-dimensional meshing of the light spots viewed in the interferogram is rectangular, and thus is better adapted for the applications of driving active or adaptative optics.

This type of analyzer is achromatic. On the contrary, the implementation thereof is complex because of the insertion of the spatial filtering system for selecting the sub-beams between the grating and the viewing plane of the interference fringe system. In addition, the spatial filtering system brings limitations for the measurement of severely disturbed light beams or light beams having a very large spectral bandwidth.

In the patent FR 2 795 175, the applicant suggested a first development of the system: this patent describes a two-dimensional grating according to a rectangular meshing composed of an intensity function, indicated by FI, which defines a rectangular meshing of sub-pupils and a phase function, indicated by FP, which introduces a shift close to π (modulo 2π) between two beams, called secondary beams, which go through two adjacent sub-pupils. The intensity function FI has a rectangular array element with an "L" dimension along one direction and a "I" dimension along the other direction; the phase function FP has an array element of 2L dimension along one direction and 2I dimension along the other direction. An elementary intensity or phase pattern is positioned on these meshes. The sides of the meshes of the phase grating and those of the meshes of the intensity grating are in coincidence. The two-dimensional grating is positioned in or close to a plane perpendicular to the light beam to be analyzed, which causes a diffraction of the beam into several different secondary beams. An image formed by the interference of the emerging beams is created and viewed in a plane, also called an analysis plane. Thus, this type of analyzer has the qualities of the analyzer described in the patent FR 2 712 978 and additionally provides an improved compactness and ease of implementation.

In the patent FR 2 896 583, the applicant provided a variant of the preceding system: this patent describes a two-dimensional grating according to an hexagonal meshing composed on an intensity function, indicated by FI, which defines an hexagonal meshing of sub-pupils, and a phase function, indicated by FP, which introduces a phase shift close to $2\pi/3$ (modulo $2\pi$) between two secondary beams which go through two adjacent sub-pupils.

Finally, in the patent FR 2 897 426, the applicant proposed an improvement in the techniques disclosed in the mentioned patents, so as to be able to measure fragmented wave surfaces without any limitation as regards the amplitude of the differences of levels between the pieces. A fragmented wave surface is defined as a surface composed by the discontinuous positioning of surface fragments of possibly different sizes with possibly gaps between the pieces and having differences of levels between the pieces. The technique described uses the treatment of two interferograms carried out with two different colors in order to analyze the wave surface with a large measuring dynamics.

In order to make a two-dimensional intensity and phase grating, the applicant carries out an etching and a metal deposition on the same plate, so as to encode the intensity function FI and the phase function FP on the same substrate. To make this type of intensity and phase grating, a privileged manufacturing method exists which is based on the known photolithography techniques. These techniques, according to the type of the pattern to be encoded are as follows:

The technique of etching a phase pattern (TP): it includes a deposition of a layer of resin, the insulation thereof and the development thereof. The developed resin encodes the phase pattern in relief which is then transferred into the substrate using a dry etching method;

The technique of etching an intensity pattern (TI): it includes the deposition of a layer of resin, the insolation thereof then the development thereof. The developed resin encodes the phase pattern in relief. A metallic layer is deposited on this layer of developed resin. The assembly is then immersed into a chemical solution which results in the dissolution of the resin and the removing of the metallized zone which covered the resin (the method is known as "lift off").

Now both steps (TP) and (TI) must be carried out successively with a strict alignment with respect to each other, which is very difficult, to make an intensity and phase grating of the same type as the one described in the patent FR 2 795 175. To solve this problem, the invention proposes to simplify the grating so that it can be made in only one step (TP). In addition, the invention makes it possible to manufacture copies of the grating in series from a master component by molding or pressing, which was not possible with the solutions of the state of the art. The present invention thus aims at providing an essential progress in this direction.

SUMMARY

The method of the invention is based on a phase function resulting from the multiplication of two phase functions, a first phase function which encodes an exclusion zone and a second phase shift fundamental function. More precisely, the present invention aims at a method for analyzing the wave surface of a light beam, from:
a) a phase function introduced by a two-dimensional grating placed substantially in a plane perpendicular to the light beam to be analyzed, optically conjugated of the plane of analysis of the wave surface and causing a diffraction of the beam into different emerging beams,
b) an intensity function, and
c) deformations of an image related to the gradients of the analyzed wave surface, this image formed by the interference of emerging beams being created and viewed in a plane ($P_S$) located at a selected distance from the plane of the grating ($P_C$).

In this method, as the intensity functions is uniform on the whole surface of the grating, the step a) includes the multiplication:
a1) of a first phase function, also called an exclusion function FPE, which defines a meshing of useful zones, and does not introduce any spatial phase variations in the transmission or the reflection of the light of the analyzed beam, which introduces a rapid phase variation, and
a2) a second phase function, also called a fundamental phase function FPF, which introduces between two neighboring light pencil beams a phase shift PHI corresponding to a meshing selected among rectangular and hexagonal meshings. Depending on the case, PHI is worth $\pi$ in a rectangular (or Cartesian) meshing, or $2k\pi/3$ (k being 0, 1 or 2) in an hexagonal meshing.

According to the invention, the exclusion zone encoded by the first phase function transmits the portion of the incident beam which goes there through in a parasitic emerging beam. This exclusion zone introduces a so-called rapid phase variation on the parasitic emerging beam. Rapid phase variation means a variation, the spatial evolution characteristic dimension of which, according to at least one direction of the grating plane, is comprised in a fraction of the dimension of the mesh along this direction, more particularly between one twentieth and one third of this dimension. This rapid variation results in the diffraction of the parasitic emerging beam into propagation directions, which are different from those of the light pencil beams transmitted by the sub-pupils. Thus, the exclusion zone encoded by the first phase function according to the invention does not substantially affect the energy diffracted by the grating in the light pencil beams. The second phase function introduces a phase shift between two light pencil beams adapted as a function of the nature of the rectangular or hexagonal meshing, of the same type as the one introduced by the prior art phase function.

The diffraction grating, thus making the multiplication of both thus defined functions, diffracts a rectangular or hexagonal meshing of light pencil beams which propagate and interfere with each other. Thus, in any viewing plane parallel to the grating plane, an image is generated which is in the form of a rectangular or an hexagonal meshing of light spots, the period of which is that of the meshing of the exclusion function and the contrast of which is substantially independent of the wavelength as well as the viewing distance. The meshing of light spots can be viewed in the grating plane, the null sensitivity plane. The meshing is advantageously viewed in a plane located at a viewing distance selected by the user as a function of the gradients of the wave surface to be analyzed and the requested phase dynamics.

This method can be operated in polychromatic light and, by adjusting the viewing distance, allows, through a continuous adjustment of the device sensitivity and dynamics, the measurement of severely disturbed light beams. In addition, this method makes it possible to measure fragmented wave surfaces without any limitation on the amplitude of the differences of levels between the pieces as described in the application for the patent FR 2 897 426. Thus, the user has at his or her disposal a dynamically continuous flexible adjustment as regards the multilateral shearing interferometer based on a diffraction grating, with a diffraction grating the transfer function of which does not makes the multiplication but on two phase functions. The user also has at his or her disposal the two color measurement mode of the fragmented wave surfaces.

An essential advantage of the invention consists in making it possible to make bidirectional gratings by omitting the delicate step of the alignment of the intensity grating and the phase grating of the prior art. As a matter of fact, it is then possible to make the grating including the exclusion zone and the useful zone according to the invention in only one operation, according to the phase pattern etching technique.

The invention also aims at a phase grating for implementing the hereabove mentioned method. Such a phase encoded two-dimensional grating is composed of two gratings of meshes in coincidence:

an exclusion phase grating encoding the exclusion function and having an array element, the mesh being composed of two zones, a first useful zone, in which the phase of incident wave is not modified, and a second exclusion zone, in which the rapid phase variation is encoded; and a fundamental phase grating encoding the fundamental phase function and having an array element including a phase elementary patent which introduces a phase shift PHI corresponding to the meshing between two light pencil beams coming out of two adjacent meshes of the exclusion grating.

A preferred two-dimensional phase exclusion grating for encoding the exclusion function has a rectangular array element with a dimension L along a first meshing direction, and a dimension I along the other direction, divided into two zones, a useful zone and an exclusion zone, the useful zone surface being close to 50% of the total surface of the mesh. The zone defining the useful zone constitutes a proportional transformation of the elementary measure the exclusion grating and the zone defining the useful zone has two sides in coincidence with two sides of the array element of the exclusion grating. Advantageously, the exclusion grating defines a square meshing.

In a preferred phase exclusion grating, a four square chessboard can be applied to the exclusion zone, each square of the chessboard having as a length a fraction a of the length L and as a width a fraction b of the width I. The phase elementary pattern of the exclusion zone introduces a phase shift close to $\pi$ (modulo $2\pi$) between two beams going through two squares of the chessboard. In this way, the incident beam on the exclusion zone is severely deviated. A preferred fundamental phase two-dimensional grating made in a material having some thickness and a transmission index has a phase elementary patent in the shape of a four square chessboard, with each square of the chessboard having the length L and the width I, two adjacent squares having different thicknesses, thus making the defined phase function through the variation of the index.

Etching operations are carried out on one of the faces of a blade having a certain thickness. The thus created grating is used by first lighting the etched face. The refraction angle on this face is greater than the limit angle arc Sin(1/n) (n being the optical index of the blade), the parasitic emerging beam diffracted by the exclusion zone is submitted to a total reflection on the face opposite the etching of the substrate. Thus, the parasitic emerging beam never reaches the analysis plane and only the light pencil beams can propagate in the direction of the analysis plane and interfere with each other.

According to particular embodiments:

the exclusion grating has an exclusion zone in which an invariant pattern along one direction of the grating is applied, thus creating a geometric structure composed of rectangles, the bigger side of which corresponds to the side L or I of the mesh and the smaller side of which corresponds to a fraction, respectively b or a of such bigger side. Such structure has a period thus constituting a fraction of the array element of the fundamental phase grating, the phase elementary patent of the exclusion zone introducing, through a variation in thickness, a phase shift close to $\pi$ modulo $2\pi$ between two beams going through two successive strips;

the exclusion grating has such an exclusion zone that it scatters the incident flow which goes there through;

the exclusion grating has exclusion zones with stepped periodic variations in thickness "e";

the fundamental phase grating (GPF) is of the chessboard type, with different levels having a difference in thickness.

Thus, the invention also relates to the analysis device integrating such a grating. This analysis device is of the type including:

α) an input optics conjugating a reference plane with the plane in which the wave surface is analyzed, β) a phase encoded two-dimensional grating defined hereabove and positioned in this reference plane perpendicularly to the grating to cause a diffraction of the beam into various emerging beams, and γ) means for viewing an image formed by the interference of emerging beams, such image having deformations related to the gradient of the analyzed wave surface.

In particularly embodiments:

the phase grating, etched on one of the faces of a substrate, creates light pencil beams by going through the exclusion meshes which are then deviated in total reflection onto the other face of the substrate;

the phase grating is operated in transmission;

the phase grating is operated in reflection.

BRIEF DESCRIPTION OF THE DRAWINGS

Other characteristics and advantages of the invention will appear upon reading the following detailed description and referring to the appended drawings which respectively show:

FIG. 3C, is a partial perspective view of an exemplary exclusion grating having a rectangular meshing of a device according to the invention;

FIG. 4, is a partial perspective view of an exemplary fundamental phase grating with a rectangular meshing of a device according to the invention.

DETAILED DESCRIPTION

Figure 1A:
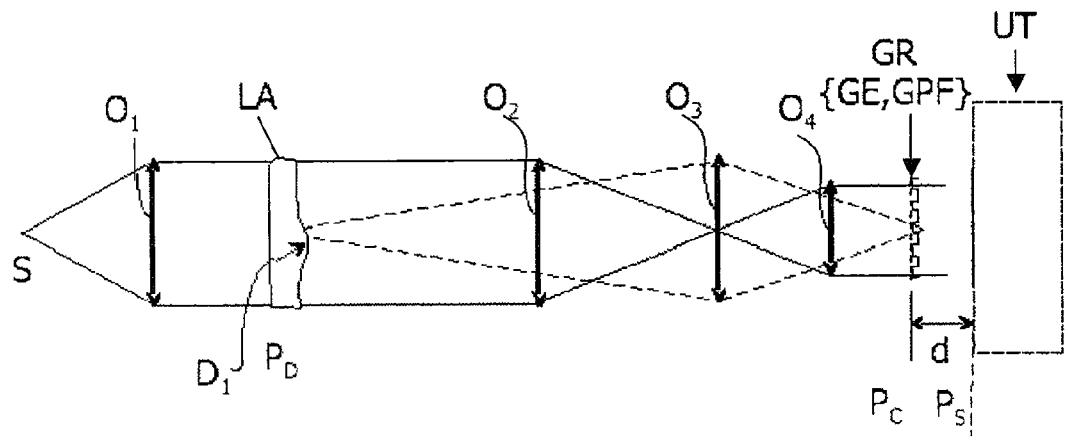
FIG. 1A, the optical diagram of an exemplary device according to the invention for the control of optical elements.
Figure 1B:
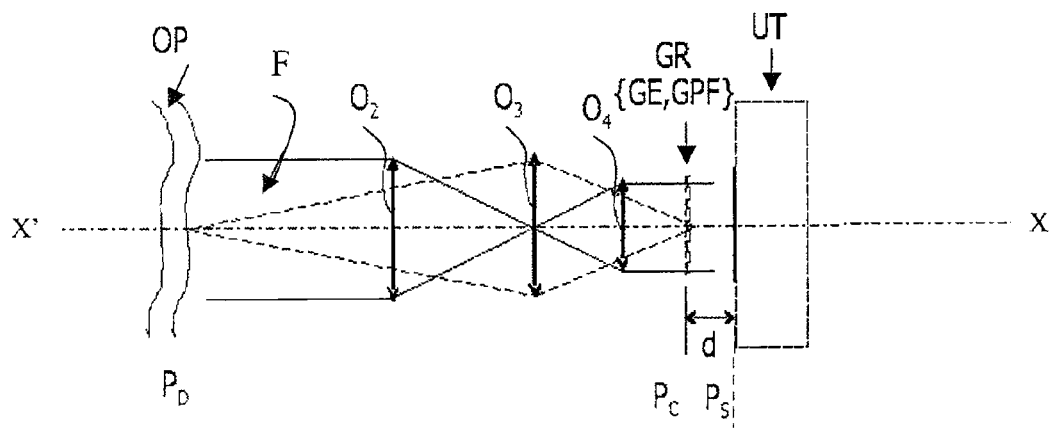
FIG. 1B, the optical diagram of an exemplary device according to the invention for the measurement of turbulent media, more particularly the terrestrial atmosphere which is gone through by a beam delivered by a polychromatic source like a star.

FIGS. 1A and 1B show two exemplary devices making it possible to implement the invention. In FIG. 1A, a polychromatic light source S is positioned at the focus of a collimating lens $O_1$. The beam F of the parallel light delivered by the lens $O_1$ illuminates the sample to be tested which is schematically shown as a blade with parallel faces LA positioned in the plane $P_D$, and having a flatness defect $D_1$. The sample can be any other optical system (a lens or a mirror more particular a telescope mirror), or simply a zone of a gaseous medium which would be disturbed for example by a flow.

In the case of an application in astronomy, a device making it possible to implement the invention is illustrated in FIG. 1B. A plane wave OP provided by a far distant source as a star for example goes through a turbulent medium, the index variations of which are represented by convolute lines.

An input assembly embodies the optical adaptation making it possible to implement the method according to the invention. This adaptation is preferably carried out by a focal system having an axis X'X composed of two lenses $O_2$ and $O_4$ with a field lens O3 in an intermediate position. This focal system has the function of adapting the diameter of the beam, analyzed in the plane $P_D$, to the dimensions of the two-dimensional grating located in a plane $P_C$, on the one hand, and of optically conjugating the plane $P_D$ in which the defect to be analyzed is located with plane $P_C$, on the other hand. Other means embodying this optical conjugation between these two plans can be used.

In the analysis plane $P_C$, a two-dimensional grating GR is positioned (FIG. 1A, 1B) and is capable of making the combination of the phase functions. Materially, this grating can be composed by placing both gratings GE and GPF in coincidence as for example those of FIG. 5, or maybe more than two. This is the particular combination of the functions which characterizes the grating of the invention.

In the exemplary embodiment shown, the grating is composed of an exclusion phase grating GE and a fundamental phase grating GPF. Both phase functions, the exclusion function and the fundamental phase function, are also called hereinunder sub-functions, as components of the same phase function. The exclusion grating GE makes an exclusion phase sub-function also called FPE, which defines a useful zone rectangular meshing transmitting the beam light to be analyzed in several light pencil beams without introducing phase spatial variations.

The fundamental phase grating GPF makes a fundamental phase sub-function, so-called FPF, which introduces, between two adjacent light pencil beams, a mean phase shift close to π (modulo 2π). The order in which these two functions are carried out in the plane is of no importance. According to the invention, the interferogram is composed of a rectangular meshing of spots. Plane $P_C$ is a null sensitivity plane.

The viewing is made in a plane $P_S$, located at a selected viewing distance "d" from the plane $P_C$. The optical processing means and image viewing means composed of the interference of the light pencil beams are designated in FIGS. 1A and 1B by reference label UT. The device dynamics and sensitivity vary according to the viewing distance. Thus, when "d" is null, the viewing plane is superimposed on the analyzing plane $P_C$, in which the grating is located and the sensitivity is null. Generally speaking, an additional means for viewing the plane $P_S$ composed for example of a lens which makes an optical conjugation between the plane $P_S$ and a more accessible working plane, can be used.

Figure 2:
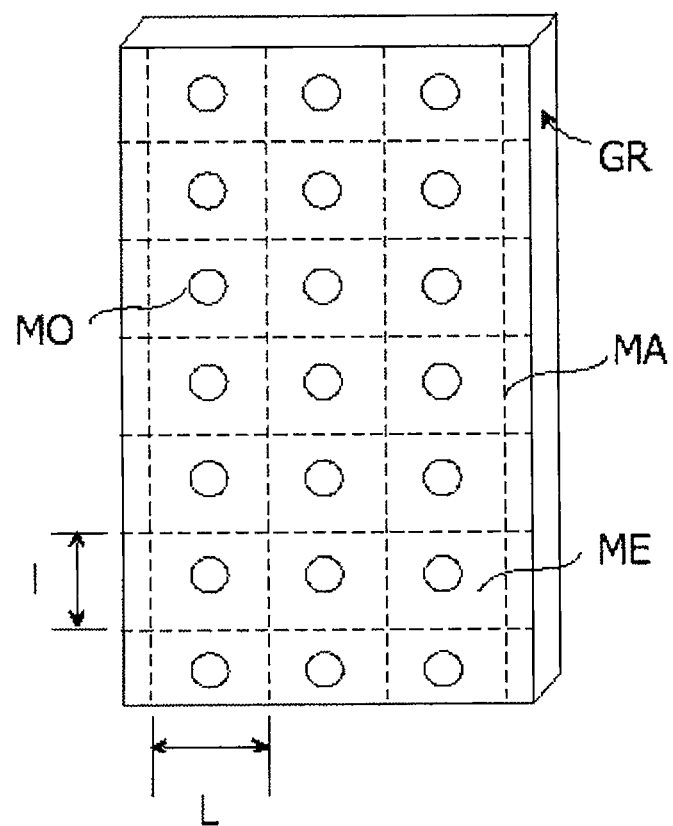
FIG. 2, an exemplary two-dimensional grating with a rectangular meshing of a device according to the invention.

FIG. 2 shows a two-dimensional grating GR with a rectangular meshing characterized by a rectangular array element "L" in length and "I" in width. Digital values of L and I are typically comprised between 50 and 200 μm. The meshing MA shown in dotted line is not necessarily visible in the final gratings. In each mesh ME, a pattern MO is shown, which introduces variations in the intensity, in the phase or in the intensity and in the phase into the incident light beam.

Figure 3A:
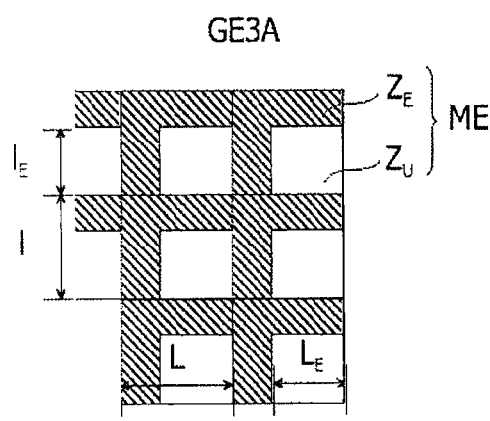
FIG. 3A, an exemplary geometry of the mesh of an exclusion grating having a rectangular meshing of a device according to the invention.
Figure 3B:
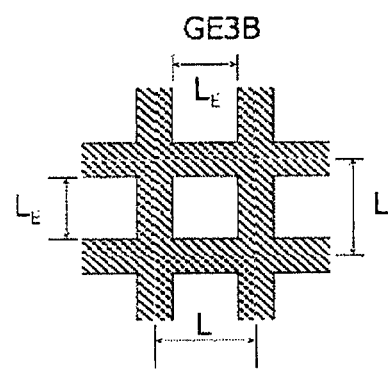
FIG. 3B, an exemplary geometry of the mesh of an exclusion grating having a square meshing of a device according to the invention.

FIGS. 3A to 3C show exclusions two-dimensional gratings which provide a simple means to carry out the exclusion function according to the method of the invention. The meshing include grey zone $Z_E$ corresponding to the exclusion zone and zones composing the useful zones $Z_U$ which can be either transparent or reflecting. FIG. 3A shows a grating GE3A with a rectangular meshing L in length and I in width. The light zones are the useful zones $Z_U$. In a privileged way, the sides $L_E$ and $I_E$ of such light zones are respectively close to 2L/3 and 2I/3. Thus, the surface of the useful zone is close to half the surface of the array element ME.

Figure 5:
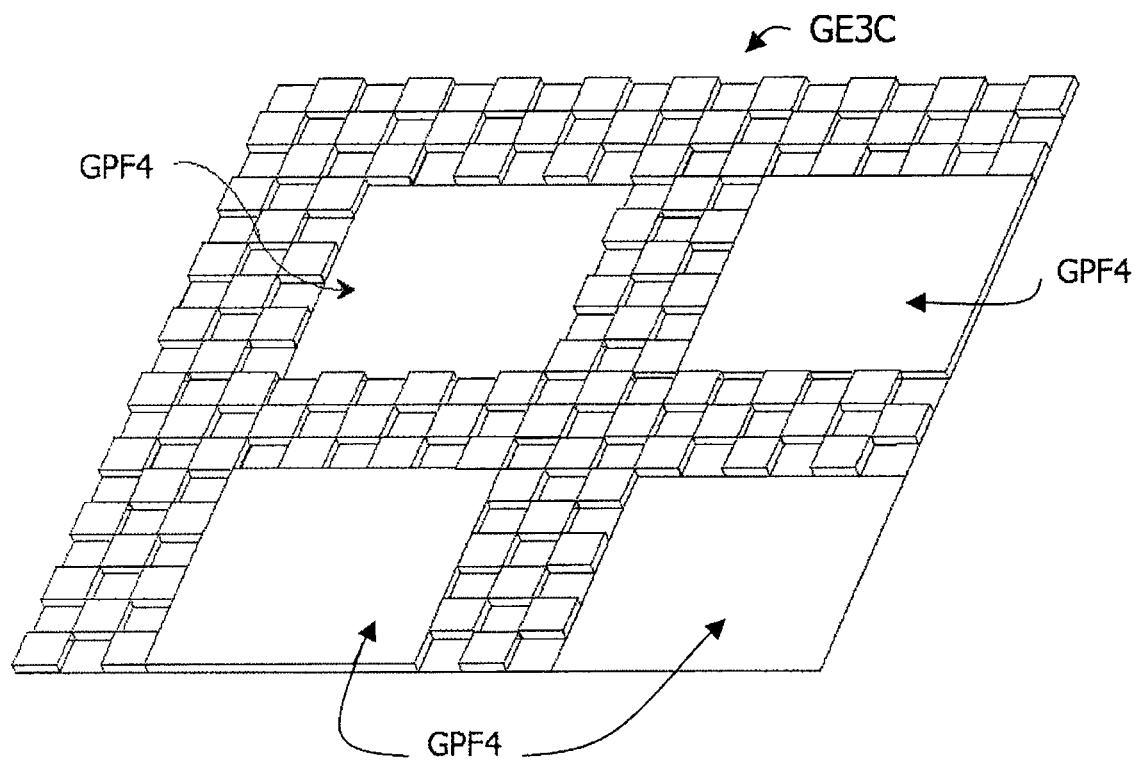
FIG. 5, is a perspective view of an exemplary grating with a rectangular meshing in compliance with the invention.

FIG. 3B illustrates an exclusion phase grating GE3B of the square mesh type, with a side L, which is the most advantageous embodiment of the invention because the optical processing of the image formed are made easier by the square meshing of the light spots. FIG. 3C illustrates, in a partial view, an exemplary exclusion grating GE3C with a rectangular meshing shown in perspective which provides simple means to carry out the exclusion function according to a method of the invention. This figure illustrates an exclusion zone $Z_E$ such that it can have a four square chessboard pattern shown $M_D$ (a pattern which is shown by the dotted line zone). Each square case Kc on the chessboard has a length equal to a fraction "a" of the length L of the mesh of a fundamental phase grating GPF—of the GPF4 type illustrated in FIG. 4—and has a width equal to a fraction "b" of the fraction of the width I of the mesh of the fundamental phase grating. In the illustrated example, this fraction is equal to ⅓. The integration in a useful zone of the fundamental phase grating GPF4 in the exclusion grating GE3C is shown in FIG. 5.

The grating covering the exclusion zone shows stepped periodical variations in thickness "e", so that the difference in thickness e between adjacent steps follows the following relation:

$$e=\lambda/(n-1)\times(k+\tfrac{1}{2}),$$

wherein:
  λ is the average utilization wavelength,
  "n" is:
the refraction index of the material in the case where the phase grating transmission is used in transmission, or
a constant of 3 in the case where the phase grating is used in reflection, and
  k is an integer.

FIG. 4 shows in perspective an exemplary fundamental two-dimensional phase grating GPF, GPF4 in the illustrated example which provides simple means for making a phase function according to the method of the invention. The grating GPF4 is of the chessboard type with a rectangular meshing of a pattern $M_{2D}$ (a pattern limited by the dotted line in the figure) with sides equal to 2L and 2I. The grating GPF4 shows stepped periodical variations in thickness so that the difference in thickness "e" between adjacent steps follows a relation of the same type as the meshing of the previous exclusion grating:

$$e=\lambda/(n-1)\times(k+\tfrac{1}{2})$$

The grey surfaces of the grating GPF4 can be either transparent for a grating used in transmission or reflecting for a grating used in reflection.

An advantageous means for embodying the gratings GE and GPF (references as to FIGS. 1A and 1B) consists in using the photolithography etching technique which is commonly used in the industry of semi-conductors. The gratings GE and GPF can thus be made by etching one blade of the substrate. With this technique, it is possible to make, with only one blade of the substrate, a two-dimensional phase grating which combines both sub-functions FPE and FPF, respectively GE and GPF. Other embodiments of both functions FPE and FPF by gratings GE and GPF can be considered, being based for example on the principle of recording on interferograms photosensitive plates, for thus obtaining the embodiment of holographic gratings. A method based on molding or pressing can also be considered for duplicating systematically and in only one step the global two-dimensional phase grating.

The combination of gratings GE and GPF makes it possible to create a totally phase-encoded grating which mainly diffracts four light pencil beams as well as a parasitic emerging beam, when placed on the path of the light beam to be analyzed. The light pencil beam can interfere on the analysis plane so as to generate an image in the shape of a rectangular meshing of light spots in any analysis plane parallel to the diffraction grating plane. The parasitic emerging grating can be severely deviated so that it never reaches the analysis plane whenever the distance between the diffraction grating and the analysis plane is sufficient; it can also be deviated from a calculated angle, so that a total reflection is operated on the face of the substrate opposite the etching; it can also create an over-modulation of the intensity with respect to the viewed intensity, an over-modulation the step of which can be chosen so as to be filtered by the pixel of the analysis plane. Eventually, the exclusion zone can scatter the light beams and thus create a uniform background superimposed to the interference figure created by the light pencil beams.

FIG. 5 illustrates an exemplary two-dimensional grating GR capable of making a phase function combining the exclusion and the fundamental phase functions by coinciding the exclusion grating GE3C (FIG. 3C) and the fundamental phase grating GPF4 (FIG. 4). The fundamental phase grating GPF4 is positioned in free spaces in the meshing $M_D$ of the grating GE3C.

The invention claimed is:

1. A phase grating comprising:
   an exclusion phase grating configured to encode an exclusion function and having an array element including two zones, a first useful zone transmitting at least two adjacent light beams in which the phase of the incident wave is not modified and a second exclusion zone in which a rapid phase variation is encoded; and
   a fundamental phase grating in coincidence with the exclusion phase grating and configured to encode a fundamental phase function having an array element in which a phase elementary pattern is positioned;
   wherein the phase elementary pattern of the fundamental phase grating introduces a phase shift between two adjacent light beams coming out of the exclusion grating.

2. A phase grating according to claim 1, wherein the exclusion grating has a rectangular array element with a dimension L along a first direction and I along another direction, divided into two zones, a useful zone and an exclusion zone, each useful zone including a proportional transformation of the array element of the exclusion grating and having two sides in coincidence with two sides of an exclusion zone.

3. A phase grating according to claim 2, wherein the exclusion grating defines an array of useful zones, the surface of which is substantially half the surface of the array element of the array of the exclusion grating.

4. A phase grating according to claim 1, wherein the exclusion grating has a square array.

5. A phase grating according to claim 1, wherein said second exclusion zone has a four square chessboard pattern, each square of the chessboard pattern having as a length a fraction of the length L of the array element of the grating along one direction and a fraction as a width I of the array element of the grating along the other direction, and wherein the phase elementary pattern of the exclusion zone introduces said phase shift to a degree of substantially $\pi$ modulo $2\pi$ between two light beams going through two squares of the chessboard pattern.

6. A phase grating according to claim 1, wherein said second exclusion zone has an invariant pattern along one direction of the grating, thus creating an alternation of strips the period of which is a fraction of a dimension of the array element of the fundamental phase grating and wherein the phase elementary pattern of the exclusion zone introduces, through a variation in thickness, said phase shift to a degree of substantially $\pi$ modulo $2\pi$ between two beams going through two successive strips.

7. A phase grating according to claim 1, wherein said second exclusion zone scatters the incident light going there through.

8. A phase grating according to claim 1, wherein said second exclusion zone has stepped periodical variations in thickness "e", so that the thickness discrepancy e between adjacent steps follows a relation:

$$e=\lambda/(n-1)\times(k+\tfrac{1}{2})$$

wherein:
   $\lambda$ is the mean utilization wavelength,
   "n" is:
      the refraction index of the material in the case where the phase grating is used in transmission or,
      a constant of 3 in the case where a phase grating is used in reflection, and
   k is an integer.

9. A phase grating according to claim 1, wherein the fundamental phase grating has a chessboard pattern having different levels with a thickness discrepancy.

10. A phase grating according to claim 9, wherein the fundamental phase grating (GPF4) has stepped periodical variations in thickness "e" between adjacent steps according to the following relation:

$$e=\lambda/(n-1)\times(k+\tfrac{1}{2})$$

in which:
   $\lambda$ is the mean utilization wavelength,
   n is:
      the material refraction index in the case where the phase grating is used in transmission, or
      a constant of 3 in the case where the phase grating is used in reflection, and
   k is an integer.

11. A device for analyzing the wave surface of a light beam in an optical control, the device comprising:
   input optics configured to optically conjugate a reference plane with a plane in which the wave surface is analyzed;
   a two-dimensional grating comprising an exclusion phase grating and a fundamental phase grating positioned in the reference plane and configured to cause a diffraction of the light beam into various emergent beams; and
   means for viewing the image formed by the interference of the emergent beams and thereby examine deformations of the image as being related to the gradient of the analyzed wave surface, wherein the exclusion phase grating is configured to encode an exclusion function and has an array element including two zones, a first useful zone transmitting at least two adjacent light beams in which the phase of the incident wave is not modified and a second exclusion zone in which a rapid phase variation is encoded and wherein the fundamental phase grating is in coincidence with the exclusion phase grating and configured to encode a fundamental phase function having an array element in which a phase elementary pattern is positioned and wherein the phase elementary pattern of the fundamental phase grating introduces a phase shift between two adjacent light beams coming out of the exclusion grating.

12. An analysis device according to claim 11, wherein the two-dimensional grating etched on one face of a substrate creates light beams by the crossing of exclusion array elements defined by the two-dimensional grating which are then deviated in total reflection onto another face of the substrate.

13. An analysis device according to claim 12, wherein the two-dimensional grating is operated in transmission.

14. An analysis device according to claim 12, wherein the two-dimensional grating is operated in reflection.

\* \* \* \* \*